(12) United States Patent
Wahler

(10) Patent No.: US 7,108,524 B2
(45) Date of Patent: Sep. 19, 2006

(54) CHIPCARD HOUSING WITH AN EJECTOR AND AT LEAST ONE LOCKING ARM COUPLED THERETO

(75) Inventor: Torsten Wahler, Bad Duerrheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/537,906

(22) PCT Filed: Nov. 11, 2003

(86) PCT No.: PCT/DE03/03727

§ 371 (c)(1),
(2), (4) Date: Jun. 6, 2005

(87) PCT Pub. No.: WO2004/053783

PCT Pub. Date: Jun. 24, 2004

(65) Prior Publication Data

US 2006/0014407 A1  Jan. 19, 2006

(30) Foreign Application Priority Data

Dec. 12, 2002 (DE) ............................... 102 58 189

(51) Int. Cl.
*H01R 13/62* (2006.01)
(52) U.S. Cl. .................................................... 439/159
(58) Field of Classification Search ................ 439/159, 439/157
See application file for complete search history.

(56) References Cited

U.S. PATENT DOCUMENTS

| 5,010,426 | A | * | 4/1991 | Krenz ...................... 360/97.01 |
| 5,286,214 | A | * | 2/1994 | Takahashi .................... 439/159 |
| 5,490,792 | A | | 2/1996 | Sugita |
| 5,518,412 | A | * | 5/1996 | Larabell ..................... 439/157 |
| 5,879,175 | A | | 3/1999 | Muramatsu et al. |
| 5,899,763 | A | * | 5/1999 | Kajiura ....................... 439/159 |
| 6,155,853 | A | | 12/2000 | Kajiura |

FOREIGN PATENT DOCUMENTS

WO   WO 96/32694   10/1996

* cited by examiner

Primary Examiner—Briggitte Hammond
Assistant Examiner—X. Chung-Trans
(74) Attorney, Agent, or Firm—Siemens AG

(57) ABSTRACT

The invention relates to a chipcard housing with an ejector and at least one locking arm coupled thereto. A gearwheel is provided for control of the locking arm which engages in a section of the locking arm resembling a toothed rack such that the drive of the gearwheel is achieved by a lug on the ejector which engages in a crank guide provided on the gearwheel.

4 Claims, 3 Drawing Sheets

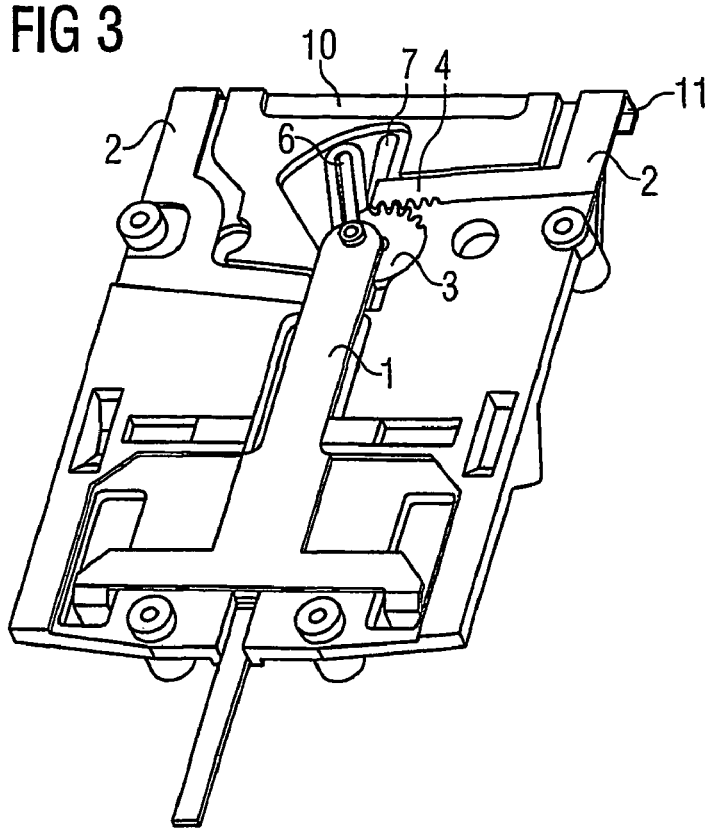
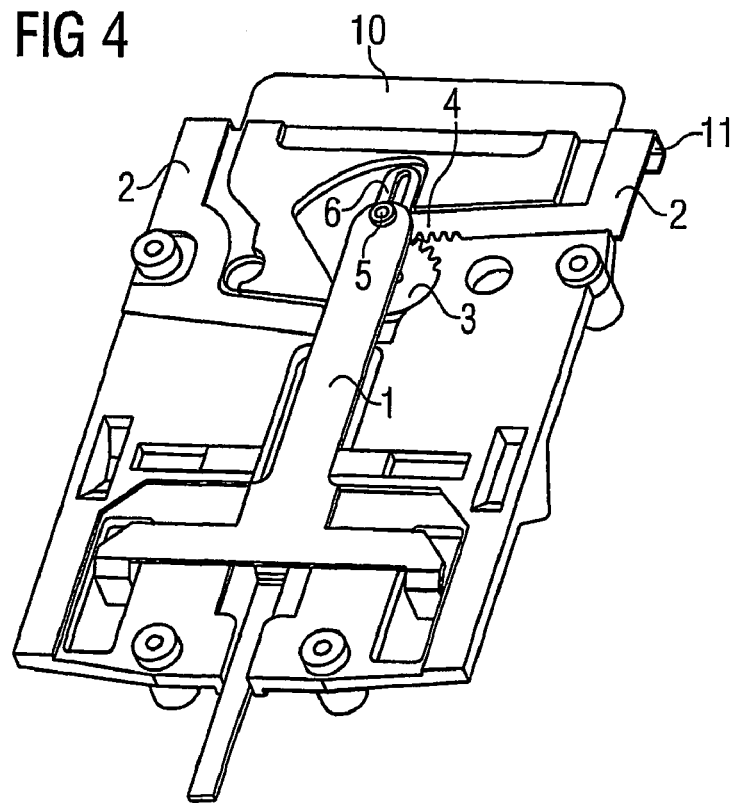

FIG 5
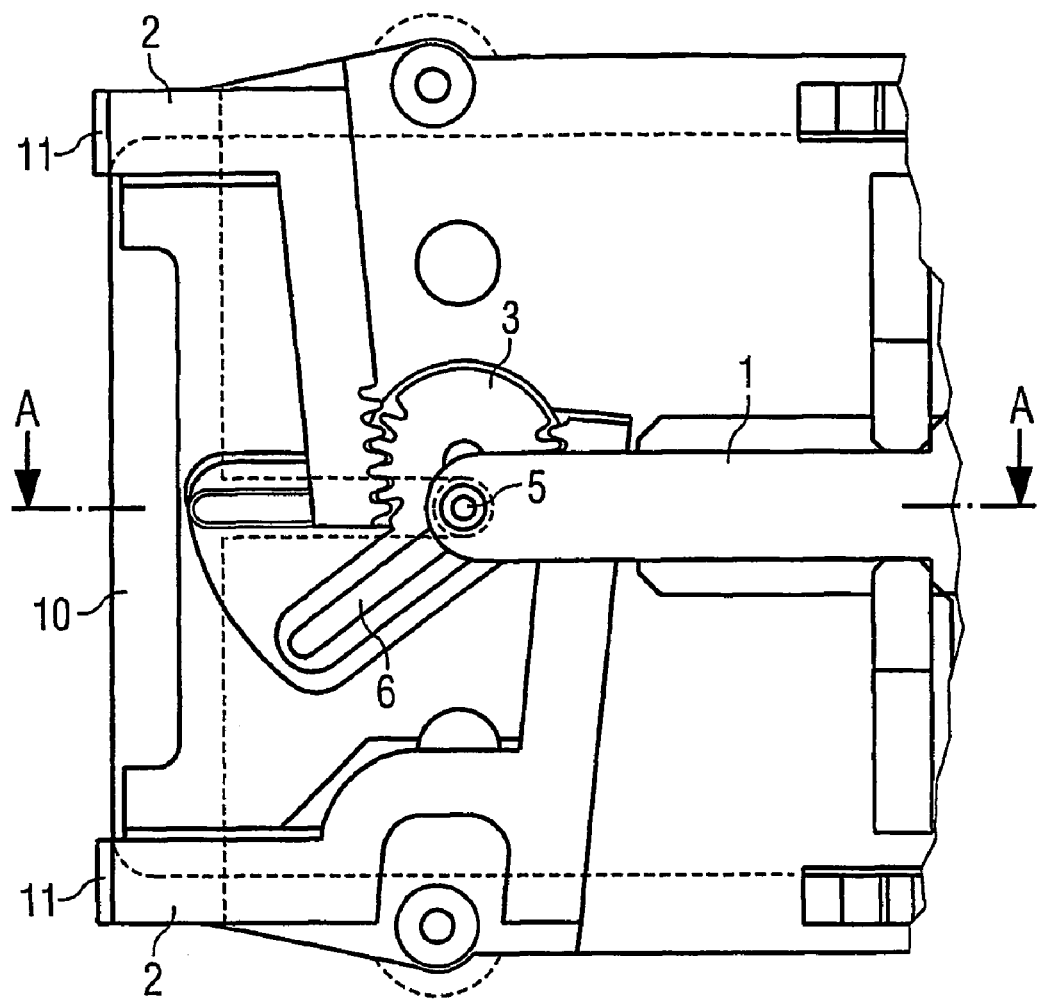
FIG 6 A-A
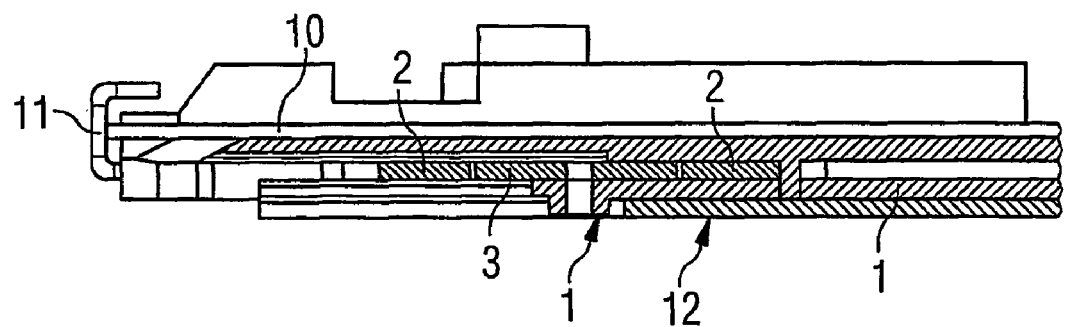

CHIPCARD HOUSING WITH AN EJECTOR AND AT LEAST ONE LOCKING ARM COUPLED THERETO

BACKGROUND OF THE INVENTION

Smart card holders of this type are used when the intention is to hold a smart card in a device for a reading or writing operation and the smart card must not be removed from the device during the writing or reading operation on account of the nature of the data it contains.

Such cases arise, for example, when financial transactions are performed, for example when the smart card is used as a cash card, or in the case of digital tachographs in which smart cards are used to identify the driver and/or to store driver- and vehicle-specific data. Since tachographs are generally used for statutory reasons, particularly stringent requirements are imposed in terms of security against manipulation, in order to ensure the evidentiary value of the recorded data. At the start of a journey, the smart card is inserted into the digital tachograph and locked in the inserted position. The smart card must be ejected automatically by the device only when said device is appropriately actuated.

The abovementioned smart card holders preferably operate in a semiautomatic manner, that is to say the smart card is pushed in manually and the locking arrangement is activated by means of this insertion operation. In contrast, the card is unlocked and ejected automatically under the control of the device.

The provision of a suitable locking mechanism is an essential measure for providing the security against manipulation. To date, this locking has been performed by means of a track guide which operates two locking slides. This mechanism is accommodated in a very low overall height. Two hardened pins which run in grooves are riveted to the slides as guide elements for the transverse movement. A further hardened pin is riveted to the opposite side and the device is actuated for the transverse movement via the tracks using this further hardened pin. A range of problems are encountered with this design from the prior art. On account of two pins being guided in grooves, a large tilting angle is produced even with low tolerances, for example an angular play of 8° results with an axial distance of 10 mm and a 0.1 mm gap. During operation, the problems arise of the riveted pins sometimes absorbing relatively high forces and the depth to which the cylinder is pressed in being very low, in particular since another depression for recessing the riveting arrangement has to be made in this case. Therefore, the pins may come loose during relatively long-term operation.

Production has been made more costly by the fact that the hardened pins are not all arranged on one side. Due to this, the part has to be machined twice, as a result of which manufacturing costs are increased. The riveted arrangements have to be recessed since a very low overall height is desired for the mechanism and the parts move relative to one another and must not get caught on one another in the process. This also leads to an increase in costs.

SUMMARY OF THE INVENTION

The object of the invention is thus to specify a smart card holder in which the locking arrangement is secure against manipulation and at the same time can be designed in a cost-effective manner. The intention is for a low overall height to be possible in the process.

According to the invention, this object is achieved by a smart card holder of the type mentioned in the introduction, which is characterized in that a gearwheel is provided for controlling the at least one locking arm and engages in a toothed rack-like section of the locking arms, the gearwheel being driven by means of a lug on the ejector and this lug engaging in a track guide which is provided on the gearwheel.

The smart card holder according to the invention operates advantageously since the time response of locking and ejection can be set by means of the track guide. In addition, no long tolerance chains are formed by the rivets in the guides. The locking arms can be designed as slides and arranged in an arbitrary V shape, as a result of which a relative movement of the locking slides is produced in the same direction in which the card is inserted or, respectively, in which it is ejected, when the smart card holder is closed. The forces which occur are then no longer absorbed by the rivets but by a solid gearwheel and its bearing point, so that the problem of the rivets coming loose can no longer occur.

The fact that only a single rivet is now necessary is advantageous in terms of production. Furthermore, the insertion length on the ejector is significantly longer than in the case of the riveting according to the prior art. The insertion length can be lengthened with the aid of deep drawn sections on the sheet metal part, this being possible by the fact that the moving parts no longer slide one over the other in the inventive design of a smart card holder and installation space is thus available underneath. Since a plurality of rivets are dispensed with, the manufacturing costs for feeding the rivets into the bores and the subsequent riveting are also reduced. Since the parts then no longer slide one over the other, the advantage is achieved of burr formation on the punched parts during punching being less critical. Riveting on the reverse side is likewise no longer necessary.

Advantageous developments of the invention are specified in the subclaims.

BRIEF DESCRIPTION OF THE SEVERAL VIEWS OF THE DRAWINGS

The invention is explained in greater detail below with reference to an exemplary embodiment. In the drawings:

FIG. 3 shows the smart card holder from FIGS. 1 and 2 with the locking arrangement partially open, FIG. 4 shows the smart card holder from FIGS. 1 and 3 with the smart card ejected, FIG. 5 shows a detailed illustration of the locking mechanism in the operating state of FIG. 3, and FIG. 6 shows a longitudinal section through the locking mechanism from FIG. 5.

DETAILED DESCRIPTION OF THE INVENTION

Figure 1:
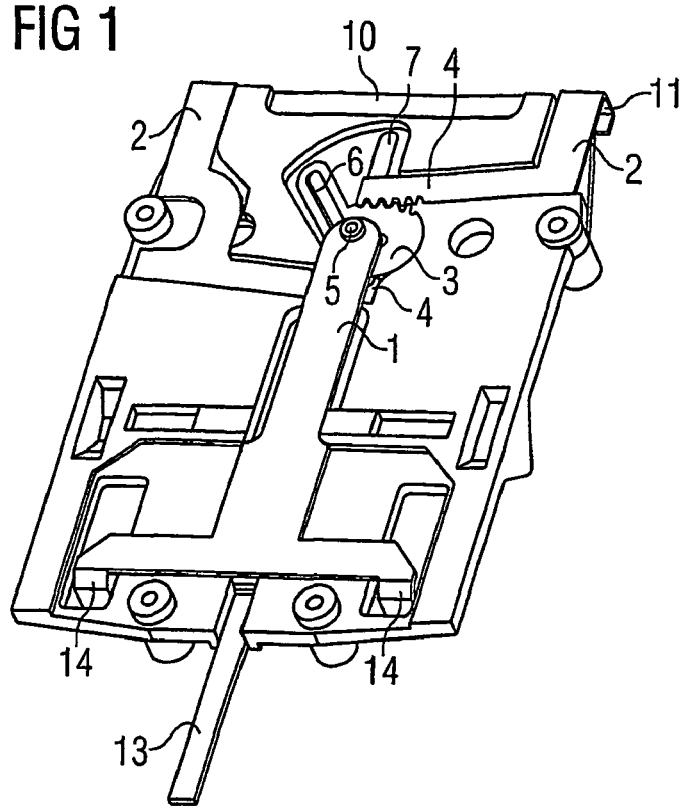
FIG. 1 shows a three-dimensional illustration of a smart card holder according to the invention with the smart card fully inserted.

FIG. 1 shows a three-dimensional view of a smart card holder according to the invention. In the operating state illustrated, a smart card 10 is fully inserted into the smart card holder. An ejector 1 is provided which is in contact with the smart card 10 by means of the two drivers 14, and which can eject the smart card 10 by means of the two drivers 14. The ejector 1 is operated by a slide 13 which engages in the ejector 1. The slide 13 is in turn operated by means of a drive which is however not illustrated and is not a subject of the invention either.

The inserted smart card 10 is locked in the inserted position by means of two locking slides 2. For this purpose, end sections 11 are provided on the locking slides 2, these end sections being pushed in front of the smart card 10 in the locked state, and the smart card 10 can therefore no longer be removed.

The locking slides 2 are driven by means of a gearwheel 3 which has two toothed regions which engage with toothed rack-like sections 4 of the locking slides 2. The locking slides 2 are pushed outward by the gearwheel 3 being rotated in the clockwise direction, so that the overlapping section 11 of the locking slides holding the smart card 10 is cleared and the smart card can be removed.

Figure 2:
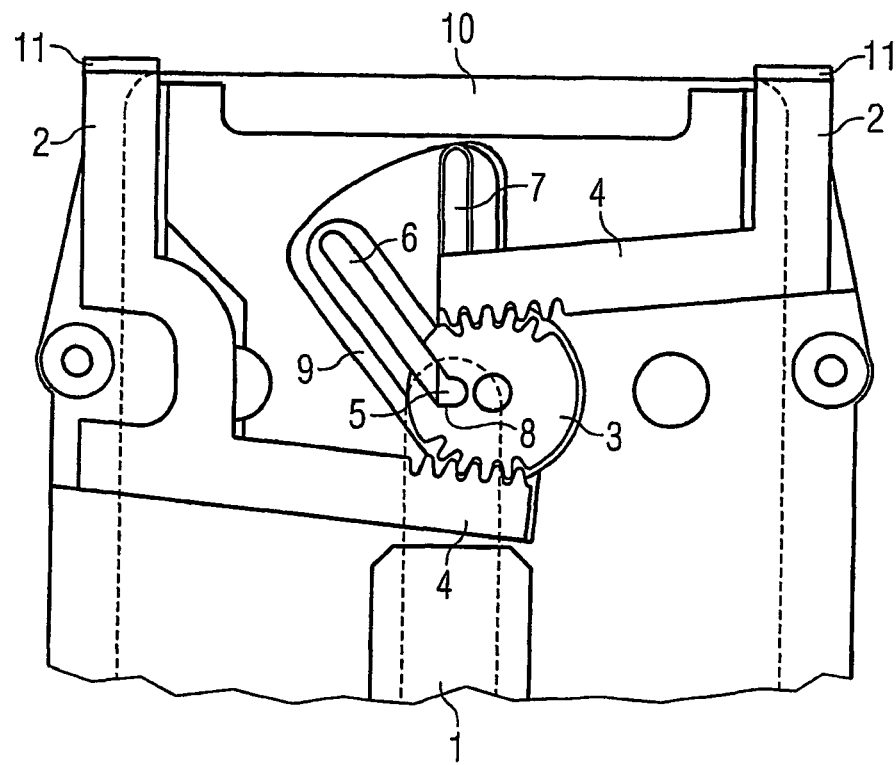
FIG. 2 shows a detailed illustration of the locking mechanism of the smart card holder from FIG. 1.

The gearwheel 3 is driven by means of a pin 5 which is arranged at the front end of the ejector 1 and engages in a track guide 6 which is formed on the gearwheel 3. The interaction between the pin 5 of the ejector 1 and the track guide 6 is illustrated in detail in FIG. 2. The track guide 6 has two sections 8 and 9 which are at an angle to one another, the first section 8 extending transverse to the ejection direction when the smart card 10 is pushed in, as in the case illustrated. The second track section 9 extends at an angle of approximately 120° to the first section 8.

The ejection process in as follows. The pin 5 of the central ejector 1, which is illustrated by dashed lines in FIG. 2 and passes on a force from an ejection gear to the locking system, engages in the first section 8 of the track guide 6. In place of a riveted-in pin, as is illustrated, other means can also be used, for example deep-drawn elements on an ejector made from sheet metal, molded-on plastic elements etc. The sickle-like track guide which is formed by two sections makes it possible for two process steps to be carried out. When the ejector 1 is moved in the ejection direction, the pin 5 exerts a force on the gearwheel 3 in such a way that said gearwheel performs a rotary movement. The teeth of the gearwheel 3 engage in toothed rack-like sections 4 of the locking slides 2 and move said slides outward. The smart card 10 is moved outward by a small distance at the same time as the locking arrangement opens.

Since the locking slides 2 have to cover only a relatively small distance compared to the ejection distance of the smart card 10, the rotary movement of the gearwheel 3 has to be decoupled from the ejection movement after the locking arrangement is completely opened. This decoupling is achieved by the direction of movement of the ejector 1 corresponding to the direction of the second section 9 of the track guide 6 when the locking arrangement is released. After the gearwheel 3 is rotated to such an extent that the locking arrangement is opened, the second section 9 of the track guide 6 is located over a guide groove 7 which runs in the ejection direction and ensures that the ejector 1 is moved in the ejection direction. When the ejector 1 moves further in the ejection direction, force is therefore no longer exerted on the gearwheel 3 and the locking slides 2, so that these remain in their positions and at the same time said locking slides 2 are prevented from slipping inward.

FIGS. 3 and 4 illustrate two instants during the ejection of a smart card 10. In FIG. 3, the gearwheel 3 has already partially rotated and the locking slides 2 have partially opened. The position of the smart card 10 in the smart card holder has moved outward by a minimal amount. In FIG. 4, the smart card 10 is already substantially ejected. The locking arrangement is completely open, that is to say the locking slides 2 are in their outermost position. As can be seen from the position of the pin 5 in the track guide 6, more space is still available for the smart card 10 to be ejected further, so that the smart card 10 can be easily grasped and extracted by a user.

FIG. 5 shows a detailed illustration of the intermediate position from FIG. 3. FIG. 6 shows the longitudinal section which runs along the longitudinal axis A-A marked in FIG. 5. The extremely flat construction of the locking mechanism can be clearly seen in FIG. 6. In comparison to the thickness of the smart card 10, the height of the locking mechanism is shown to be approximately 4 mm. A further cover 12 which is already included in the height of 4 mm is located beneath the locking mechanism.

When a smart card is inserted, the same steps are performed, but in the reverse order. The smart card 10 is first inserted and, in the process, the ejector 1 is pushed back by means of the drivers 14. Then, when the pin 5 enters the first section of the track guide 6, the smart card being inserted causes the gearwheel 3 to rotate in the counterclockwise direction and the locking slides 2 are thus moved inward, as a result of which the end sections 11 of the locking slides 2 slide in front of the smart card 10, so that said smart card is locked in the pushed-in position and cannot be manually removed. A reading or writing operation between the device, to which the smart card holder belongs, and the chip in the smart card can then begin.

The invention claimed is:

1. A smart card holder, comprising:
    an ejector,
    at least one locking arm coupled to the ejector and arranged so as to lock a smart card inserted into the holder in a locked pushed-in position,
    a gearwheel arranged to control the at least one locking arm, the gearwheel arranged to engage in a toothed rack-like section of the at least one locking arm and to be driven by a lug on the ejector whereby the lug engages in a track guide provided on the gearwheel, and
    wherein the lug is a pin attached to the ejector, extending through the track guide and reaching into a guide groove on an other side of the track guide, the guide groove running in the ejection direction.

2. The smart card holder according to claim 1, wherein the track guide comprises two sections arranged at an angle to one another, the first section running essentially transverse to the ejection direction and the lug extending through the first section when the smart card is inserted, and the second section running in the ejection direction and the lug extending through the second section when the smart card is ejected.

3. The smart card holder according to claim 2, wherein the angle between the first and the second sections is in a range of 120° to 135°.

4. The smart card holder according to claim 1, wherein the gearwheel comprises teeth in two regions running essentially transverse to the ejection direction when the smart card is inserted, the teeth arranged to operate a locking arm.

* * * * *